United States Patent
Dong et al.

(10) Patent No.: US 11,035,460 B2
(45) Date of Patent: Jun. 15, 2021

(54) METHOD FOR CONTROLLING ELECTRIC OIL PUMP

(71) Applicants: Hyundai Motor Company, Seoul (KR); KIA Motors Corporation, Seoul (KR); MYUNG HWA IND. CO., LTD., Seoul (KR)

(72) Inventors: Geon Oh Dong, Hwaseong-si (KR); Chin Chui Choi, Gwangmyeong-si (KR); Byung Jun Hwang, Seoul (KR); Dong-Kuk Han, Seoul (KR); Chul-Wan Park, Yongin-si (KR)

(73) Assignees: HYUNDAI MOTOR COMPANY, Seoul (KR); KIA MOTORS CORPORATION, Seoul (KR); MYUNG HWA IND. CO., LTD., Seoul (KR)

( * ) Notice: Subject to any disclaimer, the term of this patent is extended or adjusted under 35 U.S.C. 154(b) by 296 days.

(21) Appl. No.: 16/291,718

(22) Filed: Mar. 4, 2019

(65) Prior Publication Data

US 2019/0331216 A1  Oct. 31, 2019

(30) Foreign Application Priority Data

Jan. 5, 2018 (KR) .................. 10-2018-0001871

(51) Int. Cl.
*B60W 10/30* (2006.01)
*F16H 61/00* (2006.01)
*F01M 1/02* (2006.01)

(52) U.S. Cl.
CPC ......... *F16H 61/0031* (2013.01); *B60W 10/30* (2013.01); *F01M 1/02* (2013.01); *F01M 2001/0215* (2013.01); *F16H 2312/14* (2013.01)

(58) Field of Classification Search
None
See application file for complete search history.

(56) References Cited

U.S. PATENT DOCUMENTS

| | | | |
|---|---|---|---|
| 8,371,823 B2 | 2/2013 | Lee et al. | |
| 9,032,929 B2* | 5/2015 | Inoue | F01M 1/16 123/196 R |
| 10,280,949 B2* | 5/2019 | Kondo | E02F 9/225 |
| 2009/0118878 A1 | 5/2009 | Park | |
| 2010/0070146 A1* | 3/2010 | Ishii | E02F 9/2292 701/50 |
| 2011/0319227 A1* | 12/2011 | Kamada | F16H 61/0031 477/83 |

(Continued)

FOREIGN PATENT DOCUMENTS

| | | | | |
|---|---|---|---|---|
| EP | 1602556 A2 * | 12/2005 | ............. | B62D 5/065 |
| JP | 2005343270 A * | 0/2000 | ............. | B62D 5/065 |

(Continued)

*Primary Examiner* — Shelley Chen
(74) *Attorney, Agent, or Firm* — Brinks Gilson & Lione (57) ABSTRACT

The present disclosure provides a method for controlling the electric oil pump for a vehicle having an idle stop and go system. The system includes a control device for controlling the operation of the electric oil pump when the vehicle is stopped and restarted again. In the system, the operation of the electric oil pump is performed by an actual RPM control applying a target RPM of the electric oil pump and a torque or a current value of the electric oil pump.

7 Claims, 5 Drawing Sheets

(56) References Cited

U.S. PATENT DOCUMENTS

| | | | | |
|---|---|---|---|---|
| 2014/0190444 A1* | 7/2014 | Inoue | ................ | F01M 1/16 |
| | | | | 123/196 R |
| 2015/0176252 A1* | 6/2015 | Kim | ................ | E02F 9/2246 |
| | | | | 701/50 |
| 2015/0354170 A1* | 12/2015 | Ishihara | ............ | E02F 9/2217 |
| | | | | 701/22 |
| 2016/0311432 A1* | 10/2016 | Kaneko | ............ | B60W 10/04 |
| 2017/0241448 A1* | 8/2017 | Kondo | ............ | F16H 59/36 |
| 2017/0268662 A1* | 9/2017 | Song | ............ | F16H 61/0025 |
| 2018/0141535 A1* | 5/2018 | Yoshioka | ............ | B60W 10/30 |
| 2018/0347416 A1* | 12/2018 | Komori | ............ | F16H 61/0031 |
| 2019/0234398 A1* | 8/2019 | Endo | ............ | F04B 49/065 |

FOREIGN PATENT DOCUMENTS

| | | | | | |
|---|---|---|---|---|---|
| JP | 2012030779 | A | * | 0/2000 | ...... B60W 30/18018 |
| JP | 2000296720 | | | 10/2000 | |
| JP | 2003172165 | | | 6/2003 | |
| JP | 2003307271 | | | 10/2003 | |
| JP | 2009096326 | | | 5/2009 | |
| JP | 2012030779 | A | | 2/2012 | |
| JP | 2012197842 | | | 10/2012 | |
| JP | 2013170624 | | | 9/2013 | |
| KR | 100946524 | | | 3/2010 | |
| KR | 10-1575281 | | | 12/2015 | |
| KR | 20170108199 | A | * | 9/2017 | ......... F16H 61/0025 |
| KR | 20170108199 | A | | 9/2017 | |
| WO | WO-2013021420 | A1 | * | 2/2013 | ............... F01M 1/16 |

\* cited by examiner (PRIOR ART)
FIG. 1

METHOD FOR CONTROLLING ELECTRIC OIL PUMP

CROSS-REFERENCE TO RELATED APPLICATION

This application claims priority to and the benefit of Korean Patent Application No. 10-2018-0001871, filed on Jan. 5, 2018, which is incorporated herein by reference in its entirety.

FIELD

The present disclosure relates to a method for controlling an electric oil pump in a vehicle.

BACKGROUND

The statements in this section merely provide background information related to the present disclosure and may not constitute prior art.

In general, an idle stop and go means a system for temporarily stopping an engine when a vehicle is stopped, and for automatically operating the engine again when the vehicle starts again. In general, we have discovered that the energy wasted by idling accounts for about 10 to 15% of fuel in the vehicle. Accordingly, when such an idle stop and go is installed to the vehicle, it is possible to increase the fuel efficiency of the vehicle and reduce the exhaust gas.

For example, the vehicle with the idle stop and go system includes a Mechanical Oil Pump (MOP) connected to the engine and driven by the power of the engine, and an Electric Oil Pump (EOP) driven by electric power separated from the engine, and each of the pumps independently supplies oil to a transmission, respectively.

In the idle stop and go system, when the vehicle is stopped, the oil is supplied to the transmission by the electric oil pump instead of the mechanical oil pump driven by the engine. When the vehicle restarts after the idle stop, the oil is supplied to the transmission by the mechanical oil pump driven by the engine instead of the electric oil pump.

We have discovered that the electric oil pump is driven by the rotation of the motor with a target revolution per minute (RPM) value calculated based on the transmission state of the vehicle received from a Transmission Control Unit (TCU), while the mechanical oil pump is driven by the power of the engine so that the discharge pressure thereof is higher than the discharge pressure of the electric oil pump. As a result, when it is switched from the mechanical oil pump to the electric oil pump for supplying the oil, the pressure of the oil supplied to the transmission (e.g., the oil pressure at the point X in FIG. 2) is reduced.

Figure 1:
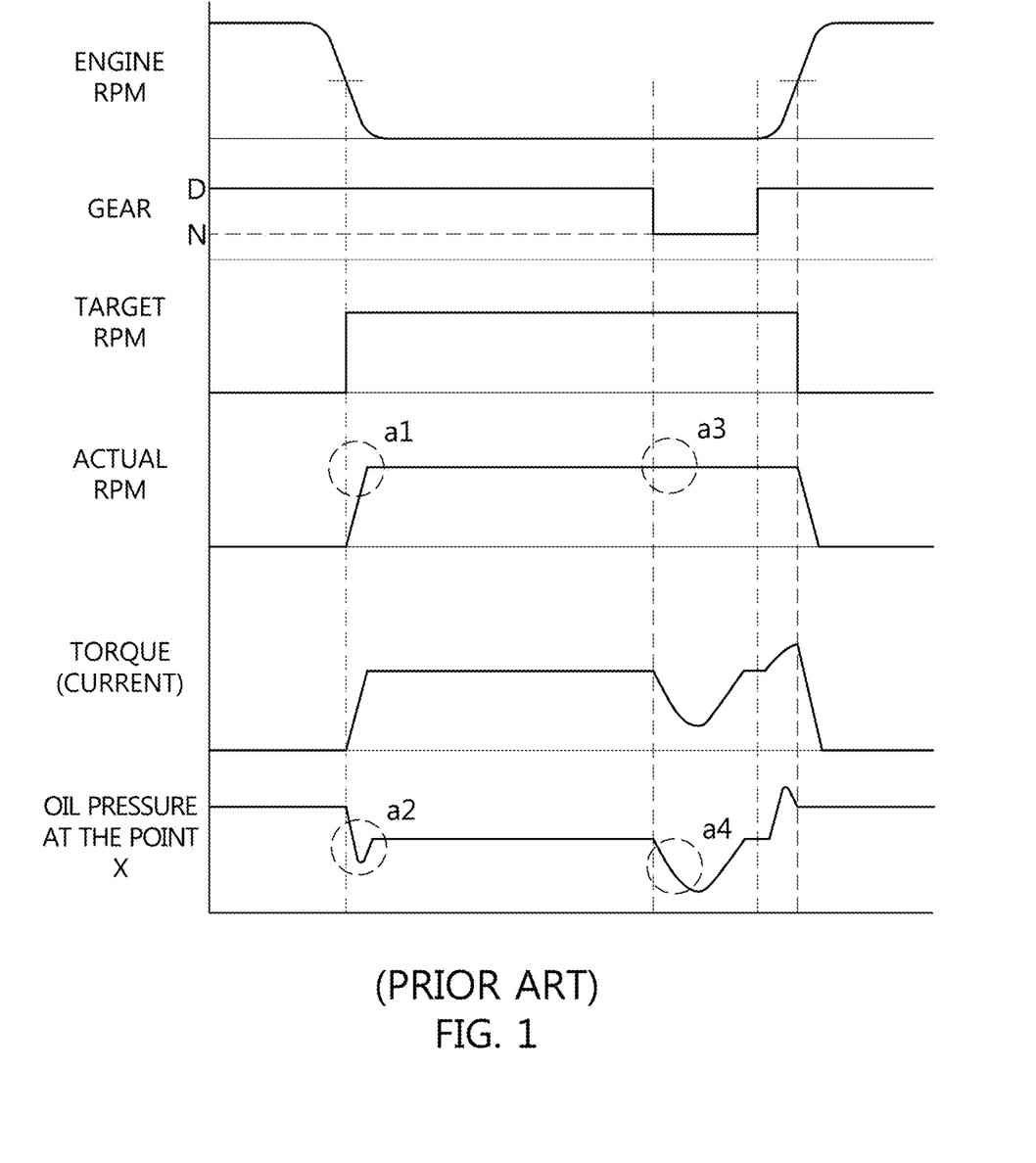
FIG. 1 is a diagram illustrating that a transmission supply pressure reduction phenomenon of the oil occurs by controlling an electric oil pump according to the conventional method in an idle stop and go provided with a mechanical oil pump and an electric oil pump.

In the control of the conventional electric oil pump as shown in FIG. 1, the a1 indicates the actual RPM controlled to become a value equal to the target RPM when the electric oil pump is operated instead of the mechanical oil pump, while the a2 indicates the pressure of the oil supplied to the transmission, which is sharply reduced when the oil pump is switched from the mechanical oil pump to the electric oil pump.

In addition, as shown in FIG. 1, the a3 indicates the actual RPM controlled to become a value equal to the target RPM when a driver performs a gear shift from the D-stage to the N-stage during driving, while the a4 indicates the pressure of the oil supplied to the transmission, which is sharply reduced in the shift situation.

The above information disclosed in this Background section is inly for enhancement of understanding of the background of the present disclosure, and therefore it may contain information that does not form the prior art that is already known to a person or ordinary skill in the art.

SUMMARY

The present disclosure relates to provide a method for controlling an electric oil pump when it is switched from a mechanical oil pump to an electric oil pump, or a gear is shifted by the operation of a driver.

The present disclosure is a method for controlling an electric oil pump for a vehicle by using a control device of the electric oil pump. The driving of the electric oil pump is operated by an actual RPM control applying a target RPM of the electric oil pump and a torque or a current value of the electric oil pump.

The actual RPM control is implemented in the order of controlling the actual RPM based on the target RPM, and then controlling the actual RPM based on the torque or the current value.

In addition, the actual RPM control implements the stop of the electric oil pump based on the target RPM.

The present disclosure provides the method for controlling the driving of the electric oil pump for the vehicle by using the control device of the electric oil pump. The method for controlling the electric oil pump includes steps of (A) determining whether the vehicle is stopped; (B) deciding the target RPM of the electric oil pump; (C) controlling the actual RPM at which the electric oil pump is actually driven based on the target RPM; (D) controlling the actual RPM based on the torque or the current value of the electric oil pump; and (E) stopping the electric oil pump based on the target RPM.

The method for controlling the electric oil pump may further include a step of determining whether the RPM of the engine is equal to or smaller than a predetermined reference stop value when the vehicle has been stopped, and the step (B) may determine the target RPM of the electric oil pump when the RPM of the engine is equal to or smaller than the reference stop value.

According to a further aspect of the present disclosure, the step (C) may include a step of maintaining the actual RPM at the maximum value of a reference RPM range when the target RPM is equal to or greater than the minimum value of the predetermined reference RPM range. The step (C) may further include maintaining the actual RPM at the target RPM after a predetermined reference time has elapsed.

According to a further aspect of the present disclosure, the step (D) may include a step of determining whether the torque or the current value is reduced when the difference between the target RPM and the actual RPM is equal to or smaller than a predetermined error value. The step (D) may further include steps of determining whether the torque or the current value is reduced to a value smaller than a predetermined reference input/output value when the torque or the current value reduces; and increasing the actual RPM in proportion to the reducing level in the torque or the current value when the torque or the current value reduces to a value smaller than the reference input/output value.

According to a further aspect of the present disclosure, the step (D) may further include a step of determining whether the target RPM is smaller than the minimum value of a predetermined reference RPM range, and the step (E) of may include a step of stopping the driving of the electric oil pump when the target RPM is smaller than the minimum value of the reference RPM range.

The step (B) may decide the target RPM of the electric oil pump in an inverse proportion to the temperature of the oil sucked by the electric oil pump.

According to the method for controlling the electric oil pump in the present disclosure, it is possible to maintain the actual RPM of the electric oil pump at the maximum value in the reference RPM range and then to maintain at the target RPM, thereby inhibiting the pressure of the oil supplied to the transmission from being sharply reduced when it is switched from the mechanical oil pump to the electric oil pump.

In addition, according to the method for controlling the electric oil pump in the present disclosure, when the torque or the current value of the electric oil pump is reduced, it is possible to increase the actual RPM in proportion thereto, thereby the pressure of the oil supplied to the transmission upon gear shift from being sharply reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
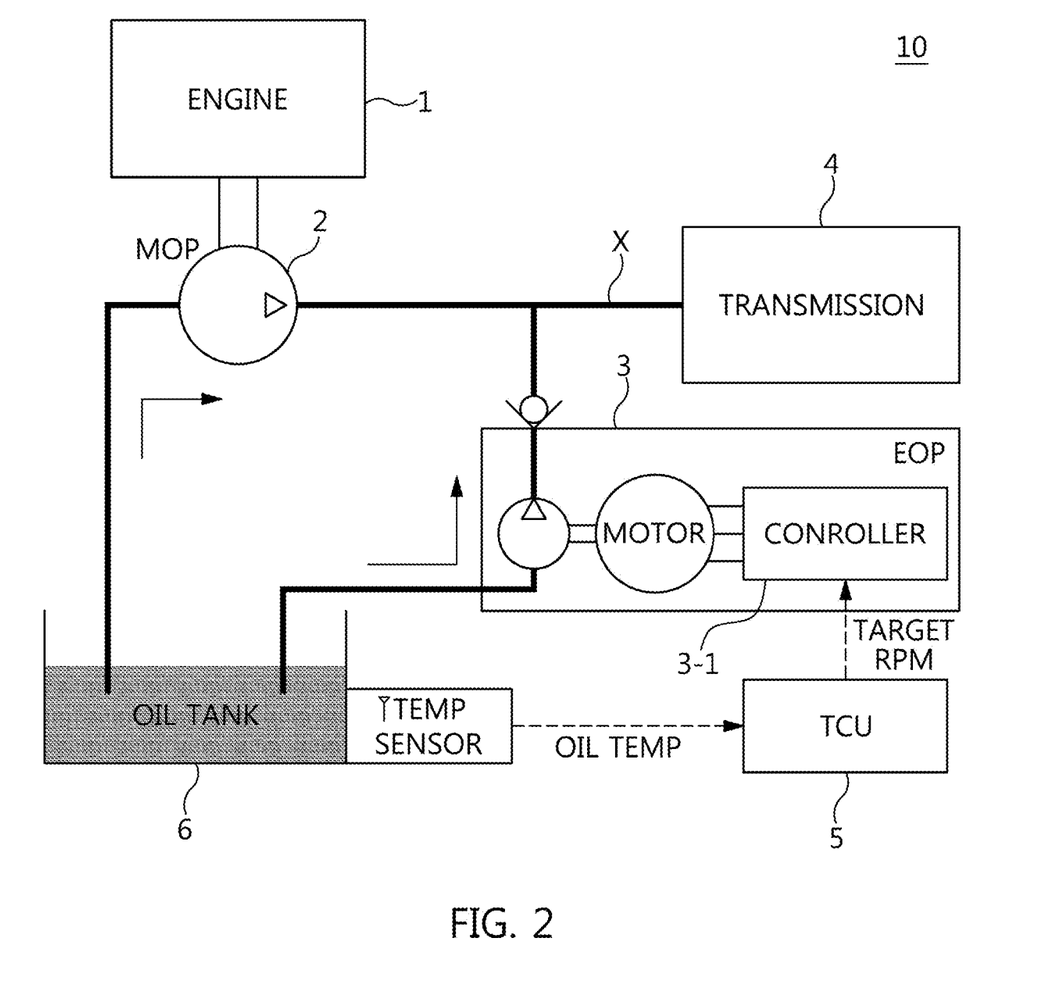
FIG. 2 is a block diagram of an idle stop and go with a mechanical oil pump and an electric oil pump including a control device for controlling the electric oil pump according to a form of the present disclosure.

Referring to FIG. 2, an idle stop and go 10 includes a Mechanical Oil Pump (MOP) 2 connected to an engine 1 and driven by the power of the engine, and an Electric Oil Pump (EOP) 3 driven by electric power through a control device 3-1 separated from the engine 1, and each of the oil pumps independently supplies oil to a transmission 4, respectively.

When a vehicle is stopped, the mechanical oil pump 2 is stopped because the engine 1 is stopped, and the electric oil pump 3 is operated to supply the oil to the transmission 4 instead of the mechanical oil pump 2. On the contrary, when the vehicle starts again, the electric oil pump 3 is stopped, and the engine 1 and the mechanical oil pump 2 connected to the engine 1 are operated again to supply the oil to the transmission 4.

Meanwhile, the electric oil pump 3 is operated based on a target RPM value calculated based on the shift state of the vehicle received from a Transmission Control Unit (TCU). Since the discharge pressure of the mechanical oil pump 2 driven by the power of the engine 1 is generally higher than the discharge pressure of the electric oil pump 3 driven by the rotation of a motor, the oil pressure supplied to the transmission 4 is reduced (e.g., the oil pressure at the point X in FIG. 2) when it is switched from the mechanical oil pump 2 to the electric oil pump 3.

Figure 3:
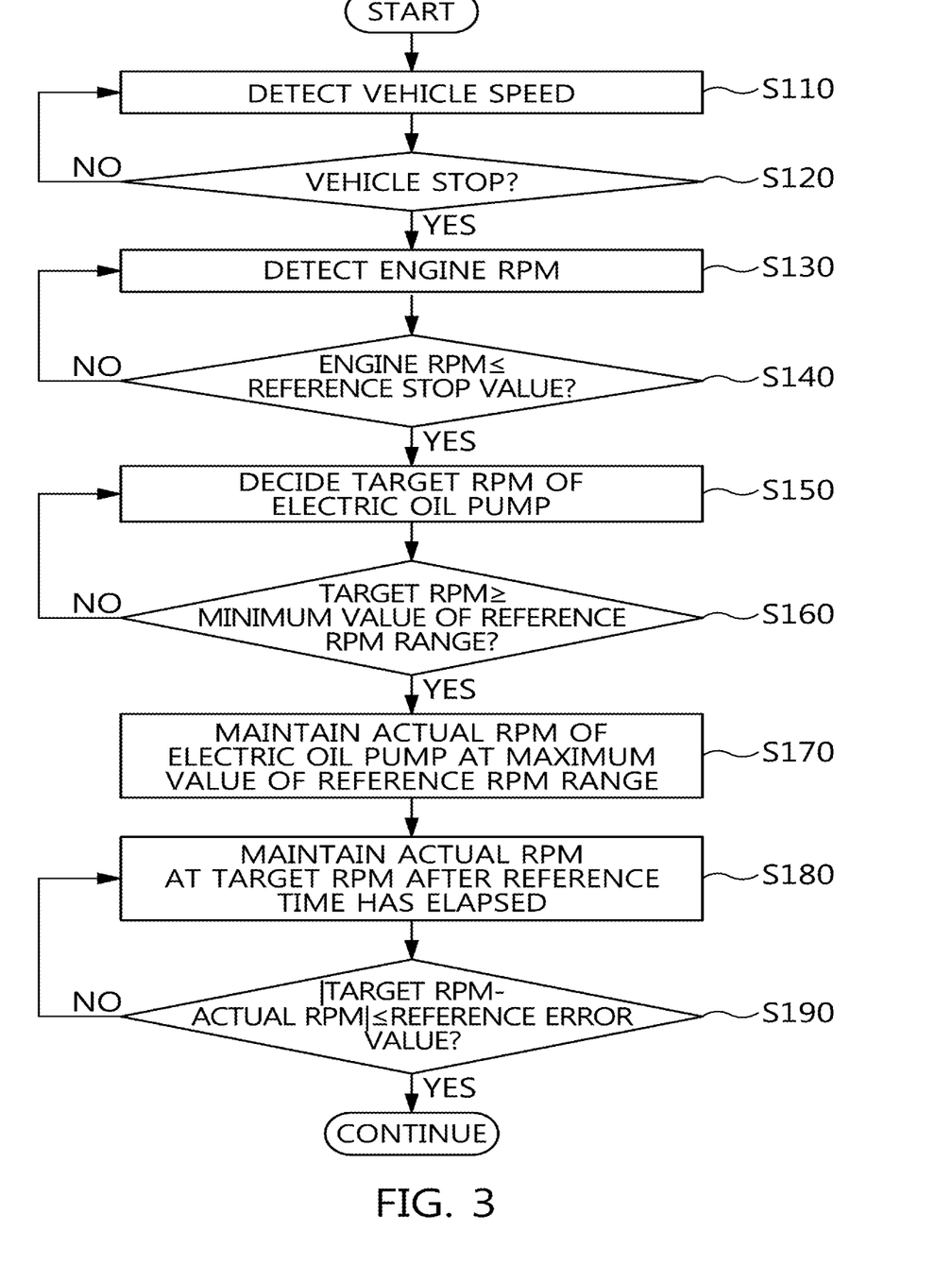
FIGS. 3 and 4 are flowcharts illustrating a method for controlling the electric oil pump according to the form of the present disclosure.
Figure 4:
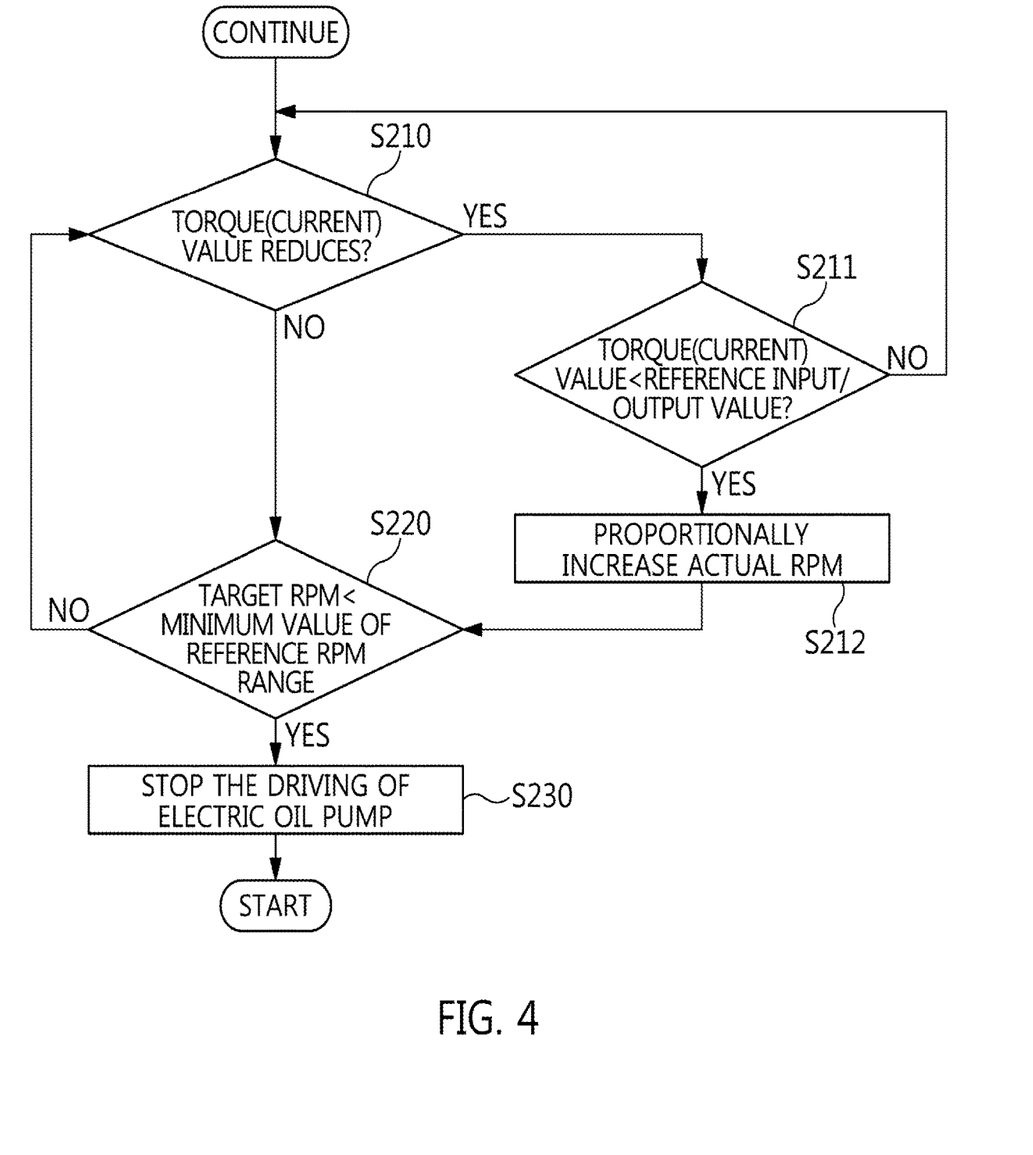

According to a form of the present disclosure, the idle stop and go 10 implements the control of the electric oil pump 3 as shown in FIGS. 3 and 4 through a control device 3-1 for controlling the phenomenon such as a1, a2, a3 and a4 as shown in FIG. 1 in a conventional electric oil pump.

The method for controlling the electric oil pump 3 as shown in FIGS. 3 and 4 is characterized that the actual RPM control is applied to the method for controlling the electric oil pump 3 for the vehicle by using the control device 3-1 of the electric oil pump 3, and the actual RPM control is characterized that the actual RPM control applying the target RPM of the electric oil pump 3 and the torque or the current value of the electric oil pump 3 is applied to the operation of the electric oil pump 3.

Accordingly, as described above, the actual RPM control is implemented in the order of controlling the actual RPM based on the target RPM, and then controlling the actual RPM based on the torque or the current value.

In addition, the actual RPM control implements the stop of the electric oil pump based on the target RPM.

Hereinafter, as shown in FIGS. 3 and 4, the control process for operating the electric oil pump 3 according to a form of the present disclosure is specifically as follows. In this case, for example, it is described that the actual RPM control is divided into individual steps.

First, the control device 3-1 of the electric oil pump 3 for the vehicle first detects the vehicle speed S110, and determines whether the vehicle is stopped S120.

Then, the control device 3-1 detects the RPM of the engine 1 or the mechanical oil pump (MOP) 2 S130 when it is determined that the vehicle has been stopped, and determines whether the RPM of the engine 1 or the mechanical oil pump 2 is equal to or smaller than a predetermined reference stop value S140.

At this time, the reference stop value corresponds to a reference RPM value of the engine 1 capable of determining that the engine has been stopped in the idle stop and go 10, and when the RPM of the engine 1 is equal to or smaller than the reference stop value, the control device 3-1 determines that the engine 1 has been stopped. For example, the reference RPM value of the engine 1 may apply about 500 RPM or less as an idle Revolution Per Minute (RPM).

Then, the control device 3-1 determines the target RPM of the electric oil pump 3 S150. Herein, the target RPM may be decided in inverse proportion to the temperature of the oil sucked from an oil tank 6 by the electric oil pump 3, and the temperature of the oil sucked from the oil tank 6 may be confirmed by the detected value of a temperature sensor installed in the oil tank 6.

The reason for this is that the oil sucked by the electric oil pump 3 is supplied to the portion with which the mechanical devices of the transmission 4 are engaged to be used to lubricate and cool the corresponding portion. Therefore, the higher the temperature of the oil sucked by the electric oil pump 3, the smaller the amount of oil supplied to the transmission 4, such that the target RPM is decided by being inversely proportional to the temperature of the oil sucked by the electric oil pump 3. At this time, the control device 3-1 may calculate the RPM value corresponding to the temperature of the sucked oil based on the previously stored reference table, and determine it as the target RPM.

After determining the target RPM, the control device 3-1 determines whether the target RPM is equal to or greater than a minimum value of the predetermined reference RPM range S160.

In this case, the reference RPM range indicates a range of the RPM value at which the electric oil pump 3 is driven, and the minimum value of the reference RPM range is a minimum RPM value for driving the electric oil pump 3.

Then, the control device 3-1 maintains the actual RPM at which the electric oil pump 3 is actually driven at the maximum value of the reference RPM range when the target RPM is equal to or greater than the minimum value of the reference RPM range S170.

Figure 5:
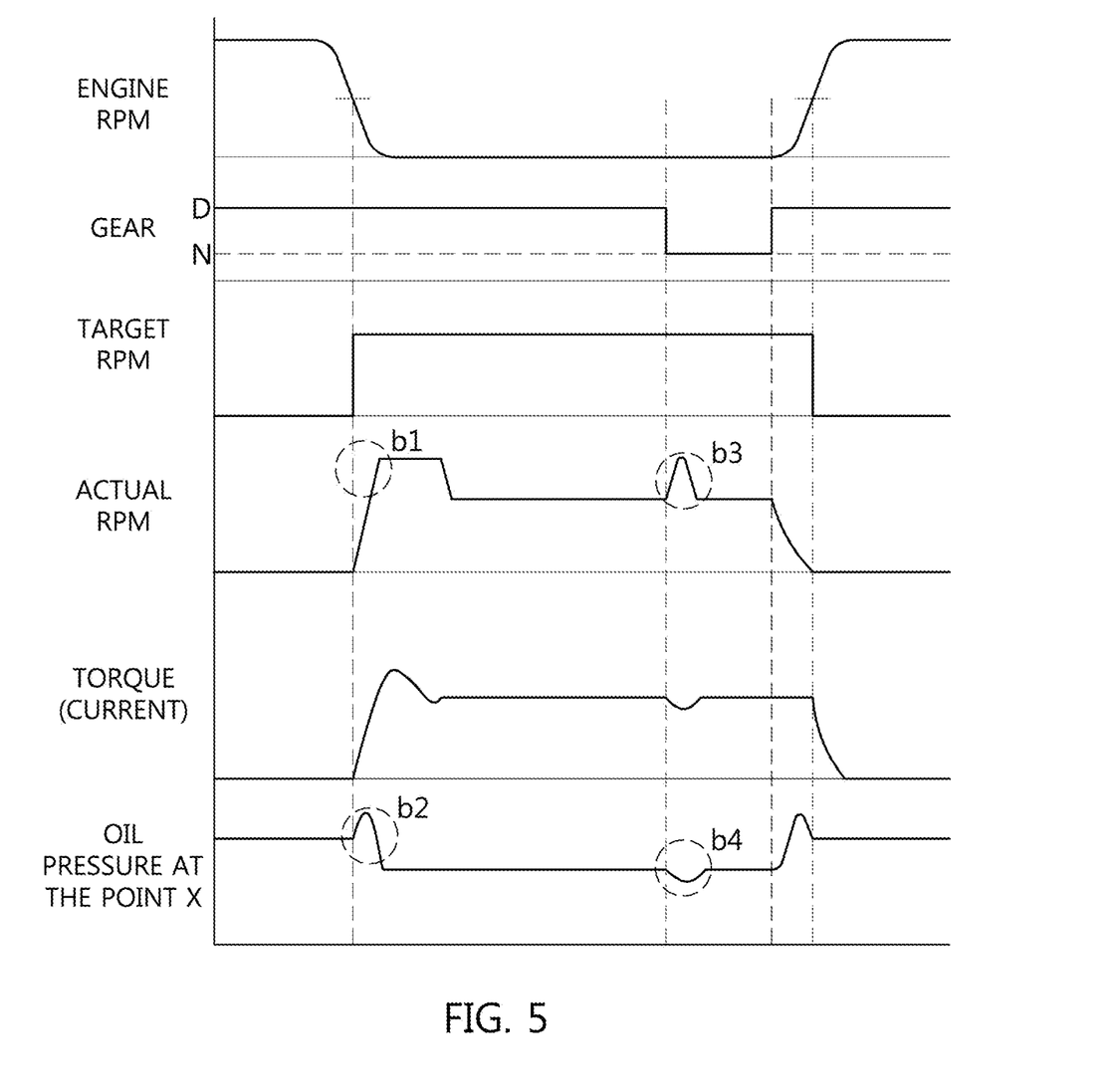
FIG. 5 is a diagram illustrating that the transmission supply pressure reduction phenomenon of the oil is avoided by controlling the electric oil pump according to the form of the present disclosure.

The reason for this is that when the actual RPM at which the electric oil pump 3 is actually driven is maintained at the maximum value of the reference RPM range as indicated by as the b1 in FIG. 5, it is possible to inhibit the pressure of the oil supplied to the transmission 4 (the pressure at the point X in FIG. 1) as indicated by the b2 in FIG. 5 from being sharply reduced, thereby stably supplying the oil to the transmission 4 while the engine 1 is stopped.

In particular, the control device 3-1 maintains the actual RPM at the maximum value of the reference RPM range during a predetermined reference time. At this time, the reference time is a time until when the operation of the mechanical oil pump 2 is fully stopped, the electric oil pump 3 is fully driven, and the pressure of the oil supplied to the transmission 4 is stabilized. For example, the full-stop of the mechanical oil pump 2 may be set as a state where the rotation does not occur due to rotational inertia, the full drive of the electric oil pump 3 may be set as a state where the pumped and discharged pressure reaches a predetermined oil pressure, and the stabilizing the pressure of the oil supplied to the transmission 4 may be applied as a state where the oil flow rate is supplied without the pulsation phenomenon or the swirl of the supply oil.

Subsequently, after the reference time has elapsed, the control device 3-1 reduces the actual RPM by the target RPM so that the actual RPM is maintained at the target RPM originally targeted S180. At this time, the control device 3-1 determines whether the difference between the target RPM and the actual RPM is equal to or smaller than a predetermined reference error value S190. In this case, the reference error value means a minimum error value capable of determining that the actual RPM has reached the target RPM.

Therefore, when the difference between the target RPM and the actual RPM is determined S190, if the difference between the target RPM and the actual RPM exceeds the reference error value, it is determined that the actual RPM has not reached the target RPM and the control device 3-1 continuously reduces the actual RPM value.

On the other hand, when the difference between the target RPM and the actual RPM is determined S190, if the difference between the target RPM and the actual RPM is equal to or smaller than the reference error value, the control device 3-1 determines whether the torque or the current value of the electric oil pump 3 is reduced S210. Herein, the torque of the electric oil pump 3 means a torque of the motor of the electric oil pump 3 or a rotor coupled to the motor, and the current of the electric oil pump 3 means a current applied to the motor of the electric oil pump 3.

Then, in the determining whether the torque or the current value of the electric oil pump 3 reduces S210, when the torque or the current value reduces, the control device 3-1 determines whether the torque or the current value is reduced to a value smaller than a predetermined reference input/output value S211. Herein, the reference input/output value means the allowable minimum value of the torque or the current value, and when the torque or the current value is reduced to a value smaller than the reference input/output value, the control device 3-1 determines that the pressure of the oil supplied to the transmission 4 is below the standard.

Therefore, the control device 3-1 increases the actual RPM in proportion to the reducing level in the torque current value S212 as indicated by the b3 in FIG. 5. Then, as indicated by the b4 in FIG. 5, it is possible to inhibit the pressure of the oil supplied to the transmission 4 from being sharply reduced as the gear is shifted.

Thereafter, the control device 3-1 determines whether the target RPM is smaller than the minimum value of the reference RPM range S220. Then, when the target RPM is smaller than the minimum value of the reference RPM range, it is determined that the driver starts the vehicle so that the idle stop and go system 10 stops the driving of the electric oil pump 3 and starts the mechanical oil pump 2 S230.

As described above, according to the method for controlling the electric oil pump in the present disclosure, it is possible to maintain the actual RPM of the electric oil pump 3 at the maximum value of the reference RPM range, and then to maintain it at the target RPM, thereby inhibiting the pressure of the oil supplied to the transmission 4 from being sharply reduced when it is switched from the mechanical oil pump 2 to the electric oil pump 3. In addition, according to the method for controlling the electric oil pump in the present disclosure, when the torque or the current value of the electric oil pump 3 is reduced, it is possible to increase the actual RPM in proportion thereto, thereby inhibiting the pressure of the oil supplied to the transmission 4 from being sharply reduced upon gear shift.

While this present disclosure has been described in connection with what is presently considered to be practical exemplary forms, it is to be understood that the present disclosure is not limited to the disclosed form, but, on the contrary, it is intended to cover various modifications and equivalent arrangements included within the spirit and scope of the present disclosure.

What is claimed is:

1. A method for controlling an electric oil pump for a vehicle by using a control device in the electric oil pump for the vehicle having an engine, the method for controlling the electric oil pump comprising steps of:
(A) determining whether the vehicle is stopped;
(B) deciding a target RPM of the electric oil pump;
(C) controlling an actual RPM at which the electric oil pump is actually driven based on the target RPM;
(D) controlling the actual RPM based on a torque or a current value of the electric oil pump; and
(E) stopping the electric oil pump based on the target RPM;
wherein the step (D) comprises a step of determining whether the torque or the current value is reduced when a difference between the target RPM and the actual RPM is equal to or smaller than a predetermined error value.

2. The method for controlling the electric oil pump of claim 1, further comprising step of determining whether a RPM of the engine is equal to or smaller than a predetermined reference stop value when the vehicle has been stopped,
 wherein the step (B) determines the target RPM of the electric oil pump when the RPM of the engine is equal to or smaller than the reference stop value.

3. The method for controlling the electric oil pump of claim 1,
 wherein the step (C) comprises a step of maintaining the actual RPM at a maximum value of a reference RPM range when the target RPM is equal to or greater than a minimum value of the predetermined reference RPM range.

4. The method for controlling the electric oil pump of claim 3,
 wherein the step (C) further comprises a step of maintaining the actual RPM at the target RPM after a predetermined reference time has elapsed.

5. The method for controlling the electric oil pump of claim 1,
 wherein the step (D) further comprises steps of:
 determining whether the torque or the current value is reduced to a value smaller than a predetermined reference input/output value when the torque or the current value reduces; and
 increasing the actual RPM in proportion to the reducing level in the torque or the current value when the torque or the current value reduces to a value smaller than the reference input/output value.

6. The method for controlling the electric oil pump of claim 5,
 wherein the step (D) further comprises a step of determining whether the target RPM is smaller than a minimum value of a predetermined reference RPM range, and
 wherein the step (E) comprises a step of stopping a driving of the electric oil pump when the target RPM is smaller than the minimum value of the reference RPM range.

7. The method for controlling the electric oil pump of claim 1,
 wherein the target RPM of the electric oil pump is decided in an inverse proportion to a temperature of an oil sucked by the electric oil pump.

* * * * *